July 28, 1931. P. J. SHRUM 1,815,957
FLANGE PROTECTOR
Filed March 14, 1928
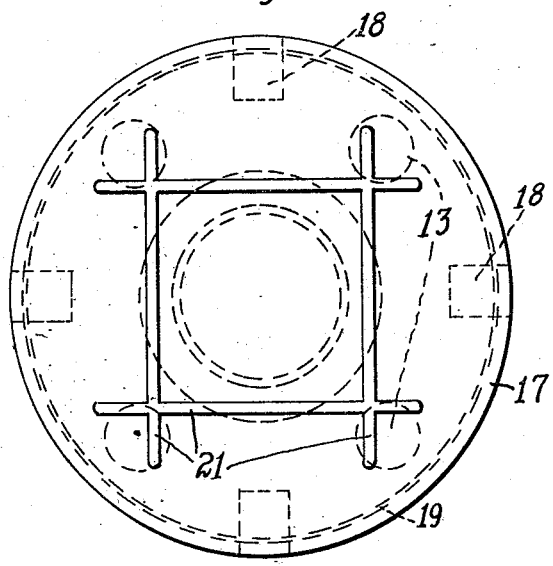
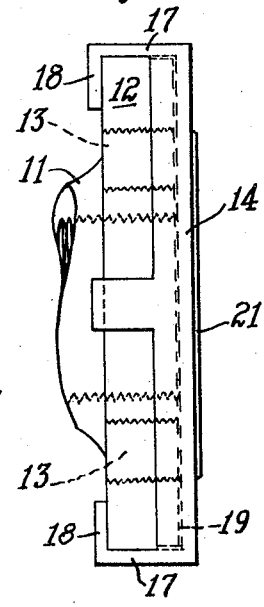
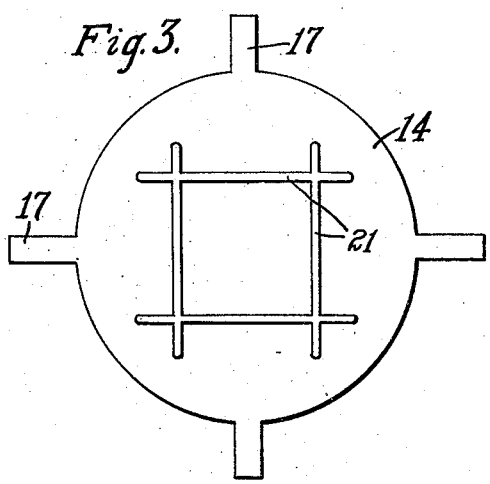
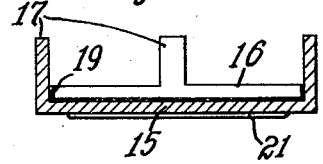
INVENTOR.
Peter J. Shrum
BY Green & McCallister
His ATTORNEYS.

Patented July 28, 1931

1,815,957

UNITED STATES PATENT OFFICE

PETER J. SHRUM, OF MONACA HEIGHTS, PENNSYLVANIA, ASSIGNOR TO PITTSBURGH SCREW AND BOLT CORPORATION, A CORPORATION OF PENNSYLVANIA

FLANGE PROTECTOR

Application filed March 14, 1928. Serial No. 261,504.

This invention relates to protectors and more particularly to protectors for flanges and the like.

In shipping valves having flange portions thereon for connecting such valves to pipes and the like, the face of such flanges often becomes distorted or abused due to the rough handling which they are subjected to during transportation and since the face of such flanges is employed for making water or air tight connections, it is very important that the face be kept free from blows, dirt, moisture and the like and it is one object of this invention to provide a protector which can be produced inexpensively and which can be readily applied to and removed from the flanges of valves, pipes and the like which will thoroughly protect such flanges and which will not come off under the action of continuous chattering or vibration.

Other objects of this invention may be briefly summarized as consisting of certain novel details of construction and combination of which will be described in the specification and set forth in the appended claims.

In the accompanying sheet of drawings, Fig. 1 is a front elevational view of a flange having a protector embodying the invention disposed thereon; Fig. 2 is a side elevational view of Fig. 1; Fig. 3 is a plan view of sheet metal initially stamped for forming the protector and Fig. 4 is a sectional view through a completed protector.

In the drawings 11 is a valve, pipe or the like having a flange 12. The flange 12 is provided with a plurality of threaded openings 13 disposed therethrough for connecting it to a cooperating flange and 14 is a protector disposed thereon for protecting the flange.

The protector comprises a unitary piece of sheet metal stamped to form a cylindrical body portion 15. The body portion 15 terminates in a continuous annular flange 16. The continuous annular flange 16 is provided with a plurality of extended portions 17 adapted to be bent around the rear face of the flange, as shown at 18, for clamping the protector in rigid fixed relation with the flange.

It can be seen from the above that the cylindrical portion 15 and the annular flange 16 comprise a protector more or less of cup shape for receiving the front of the flange and thereby protecting the front face of the flange which is employed for making connection with a cooperating flange, and that a projection 17 extends beyond the width of the flange and when bent upon such flange, as shown at 18, clamps the protector in rigid fixed relation to the flange.

I also provide a suitable lining 19 such as felt for the inner surface of the protector. This lining serves as a cushion to absorb any blows that the protector may be subjected to and prevent any distortion of the face of the flange. I also prefer to saturate the lining 19 with any suitable lubricant for lubricating the portions of the flange to be protected and thereby preventing deterioration of such portions, due to moisture.

The present protector is of the simplest form and can be cheaply produced. Fig. 3 shows the initial blank of the protector stamped from a piece of sheet metal and Fig. 4 shows a protector stamped into finished form.

In order to strengthen the cylindrical or main body portion 15 of the protector, I provide suitable ribs 21 thereon, as shown in Fig. 3 for strengthening the protector.

It is obvious from the above that the present protector is of the simplest design, can be cheaply manufactured and will efficiently and positively protect the flange from blows, as well as dirt, moisture and the like.

While I have illustrated and described one embodiment of the invention, it will be apparent to those skilled in the art that certain changes, modifications, substitutions, additions, and omissions may be made in the protector without departing from the spirit and scope of the appended claims.

What I claim as new and desire to secure by Letters Patent is:

1. A flange protector formed from a piece of sheet metal comprising a flat circular body portion, ribs projecting from said body portion, a unitary annular flange disposed at the edge of the body portion in a plane at substantially right angles thereto for forming a concavity for receiving the front face of a flange to be protected, a lubricating pad in said concavity and spaced bendable projections on said annular flange adapted to be bent over the rear face of said flange for securing the protector in rigid fixed relation thereto.

2. A flange protector having a cylindrical body portion closed at one end for forming a cup shaped pocket adapted to receive the face of a flanged article, reinforced ribs projecting from the closed end of said body portion, a felt lining in said pocket, and lugs spaced on the open end of said cylindrical portion adapted to be bent over the rear face of said flanged article and secure the protector to the article.

In testimony whereof, I have hereunto subscribed my name this 25th day of February, 1928.

PETER J. SHRUM.